CANISTER TYPE SUCTION CLEANER

Original Filed Oct. 19, 1950 2 Sheets-Sheet 1

Inventor:
Henry T. Lang,
by Merriam & Smith
His Attorney.

CANISTER TYPE SUCTION CLEANER

Original Filed Oct. 19, 1950 2 Sheets-Sheet 2

Inventor:
Henry T. Lang,
by Sheridan & Berry
His Attorney.

Reissued July 13, 1954 Re. 23,852

UNITED STATES PATENT OFFICE 23,852

CANISTER TYPE SUCTION CLEANER

Henry T. Lang, Cleveland, Ohio, assignor to General Electric Company, a corporation of New York Original No. 2,605,858, dated August 5, 1952, Serial No. 191,034, October 19, 1950. Application for reissue October 22, 1953, Serial No. 387,824

8 Claims. (Cl. 183—37)

Matter enclosed in heavy brackets [ ] appears in the original patent but forms no part of this reissue specification; matter printed in italics indicates the additions made by reissue.

My invention relates to suction cleaners, popularly known as vacuum cleaners. More particularly, my invention relates to suction cleaners of the canister type, that is cleaners in which the body of the machine is in the form of a bucket or canister. The particular items of a canister cleaner to which my invention relates are improvements in the interior arrangement and construction of parts of the cleaner, in the air filtering or dust collecting arrangement within the cleaner, and in the air outlet or exhaust from the cleaner. The present application is a *reissue application based upon my U. S. Patent 2,605,858, issued August 5, 1952, which matured from application Serial No. 191,034, filed October 19, 1950, which was a* continuation-in-part of my *then* copending application Serial No. 159,493, filed May 2, 1950, now Patent 2,539,195, issued January 23, 1951, and assigned to the same assignee as the present application.

The objects of my invention are to provide a cleaner which may be operated over long periods of time without substantial decrease in the efficiency of the cleaner and to prevent damage of the air filter within the cleaner, which damage might be caused by the air blast from the intake in the cleaner. Thus with my invention relatively fragile materials may be used for the dust filter. Stability of the cleaner when in use, quietness of operation, and ease and economy of manufacture are also among the objects of my invention.

Figure 1:
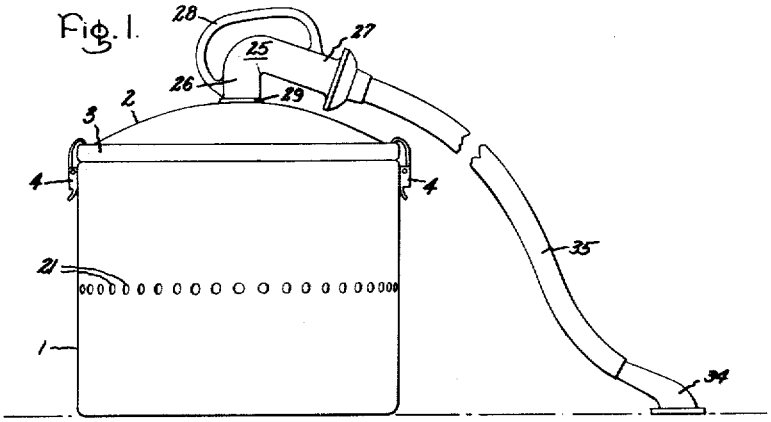
Figure 2:
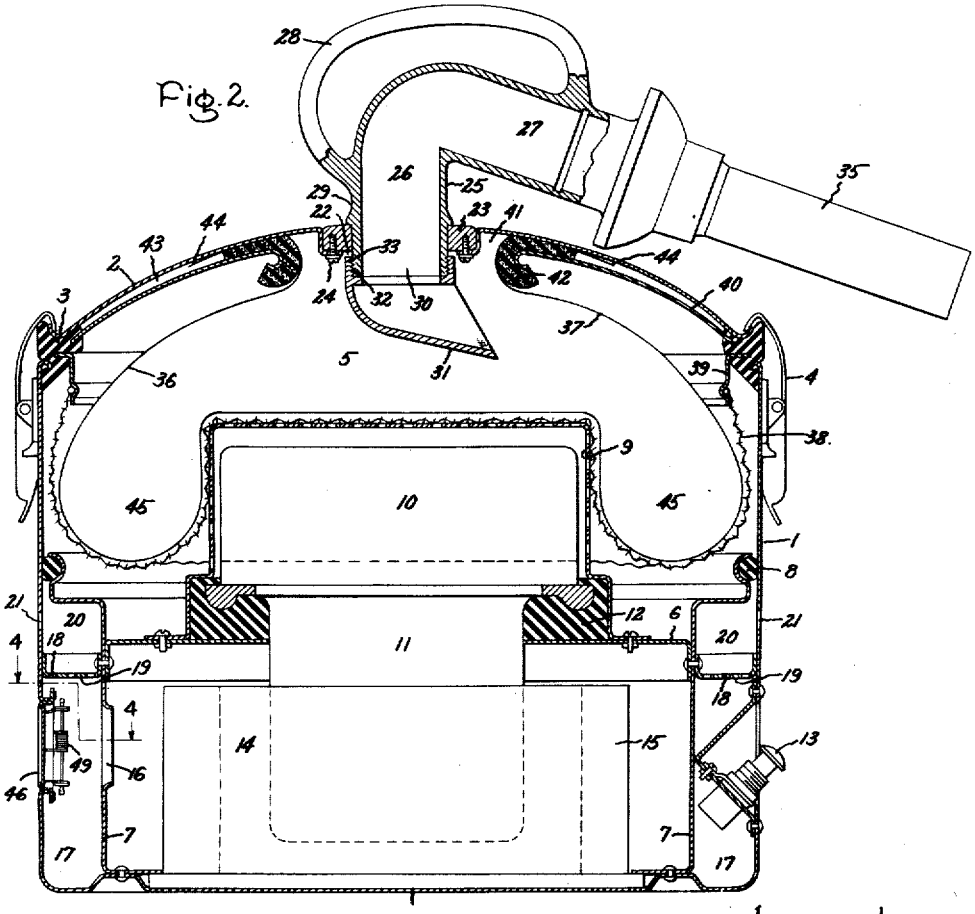
Figure 4:
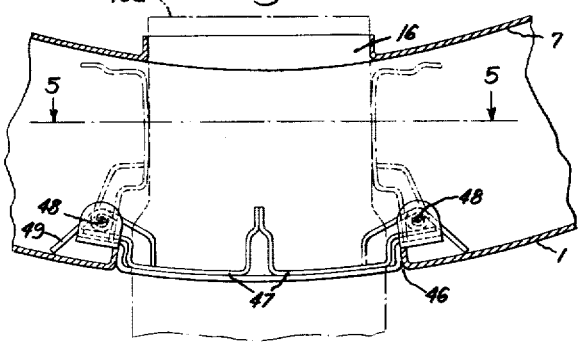
Figure 5:
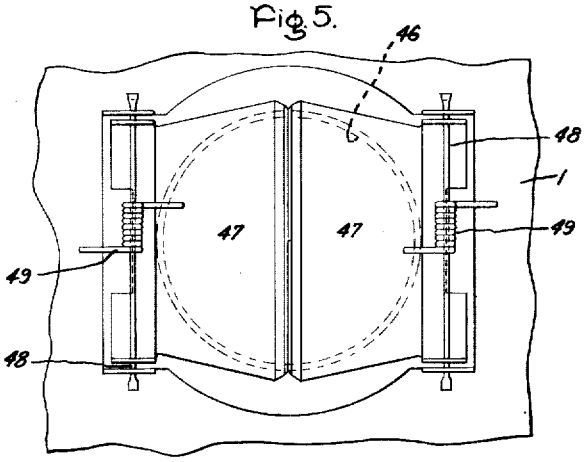
Figure 3:
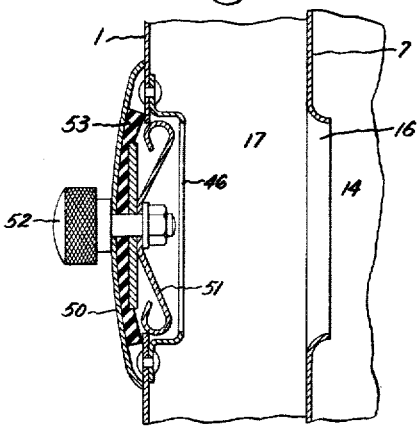

Other objects and details of that which I believe to be novel and my invention will become apparent from the following description and the claims appended thereto taken in conjunction with the accompanying drawing in which is illustrated an exemplary form of canister cleaner embodying the present invention and incorporating my improvements. In the drawing, Fig. 1 is a side view of a canister cleaner embodying my invention; Fig. 2 is a cross-section on an enlarged scale showing the interior parts of the cleaner of Fig. 1; Fig. 3 is a partial sectional view similar to a portion of Fig. 2, shownig a modification; Fig. 4 is an enlarged section on the line 4—4 of Fig. 2, and Fig. 5 is a view on the line 5—5 of Fig. 4.

A suction cleaner of the character involved here has the usual cylindrical outer tank or canister 1 with an open top closed by a cover 2. A gasket 3, of rubber or other similar material, seals the joint between the top of the canister and the bottom of the cover. Cover clamps 4, of any suitable design, removably secure the cover to the canister when the cleaner is in use.

Within the canister a support for the usual motor and fan is required, and I have shown this in the form of a novel frame having a generally horizontal platform portion 6 and vertical walls 7 supporting the platform from the bottom of the canister. The frame or platform is open at its center, and the central opening is covered by a perforated metal screen 9, shown as covering the inlet end of the fan 10 which is driven by the motor 11. The fan and motor are secured together and may be considered as a unit. This unit is mounted in a rubber ring 12 which is secured around the central opening in the horizontal frame or platform. The horizontal portion 6 of the platform divides the interior of the canister into a suction chamber 5 above the horizontal wall 6, and an exhaust chamber 14 below the horizontal wall. A gasket 8 seals the outer edges of these chambers from each other. The mounting ring 12 serves to seal the motor and fan unit across the central opening between the chambers.

A pushbutton type motor control switch 13, which may be located as shown near the bottom of the canister on the outside, is suitably connected as by wires (not shown) to the motor 11. Other wires (not shown) lead to the switch from a suitable power source in the usual fashion. As will be obvious, upon operation of the motor, air will be drawn into the motor-fan unit at the top and discharged at the bottom.

Air coming from the fan and motor unit may be discharged directly to the outside atmosphere but I prefer the novel arrangement described below. This includes the exhaust space 14 below and around the motor unit and below the partition 6 within the canister, in which space is located an annular muffler or noise deadening ring 15 which rests on the bottom of the canister but has an open top below the horizontal platform 6. Air will pass over the top of the muffler, through the opening 16 in the vertical wall 7 of the platform member and into an annular exhaust space 17 between the outer tank wall and the vertical platform wall. From the space 17 the air will pass upwardly through the holes 18 in a horizontal ring 19 which is secured to the platform supporting member. Above the ring 19 is an annular discharge space 20 which may be filled with glass wool, shredded paper, soft felt, or other similar material for the purpose of finally filtering the air and further suppressing noise from the motor and fan of the cleaner. From the discharge space 20 the air leaves the cleaner as by a series of discharge holes 21 in the outer tank walls, located at a level surrounding the fan and motor unit and therefore substantially above the floor level around the entire circumference of the cleaner. This discharge around substantially 360° of the circumference of the canister and away from the floor so diffuses the air that practically no "blast" is observed in normal operation. Disturbance of air around the cleaner is thereby prevented. *The arrangement disclosed above, by way of example, of having discharge openings around substantially 360° of the circumference of the canister diffuses the discharge air most effectively, however, it will be recognized by those skilled in the art that the discharge openings may cover less than substantially 360° of the circumference.*

Noise of operation will also be reduced by the arrangement shown and described here, which obviously additionally aids in removing dust from air passing through the cleaner.

I refer now to the suction inlet and dust collection parts of the cleaner, these being mounted on and directly underneath the cover of the tank or canister. As can be readily understood from the drawings, the cover 2 is provided with a circular opening 22, preferably located at the center of the cover. This inlet opening is surrounded by a bearing ring or surface 23 which is suitably held in place on the cover as by screws 24. Extending through this bearing ring and having a close but rotatable fit therewith is the tubular inlet fitting 25, shown here as of generally L-shape. This fitting has a vertical portion 26 communicating with an approximately horizontal portion 27. The fitting may be provided with a handle 28 for manipulating the inlet fitting, for lifting the cover and for carrying the entire cleaner when the cover is clamped to the canister. It may be noted that the approximately horizontal portion 27 is directed at an angle toward the floor and is not exactly parallel to the floor. This is for a purpose more fully described and claimed in my patent application Serial No. 159,494, filed May 2, 1950, *now abandoned*, and assigned to the same assignee as the present invention.

The vertical portion of the inlet fitting is provided with an annular shoulder 29 which rests on the bearing ring, and an open end 30 which is directed downwardly generally toward the perforated screen 9 on the motor supporting frame. In order to prevent direct flow of air from the open end of the inlet fitting to the top of the perforated screen, I provide a horizontally directed deflector trough 31 which is suitably secured over the open end of the inlet fitting as by cooperating screw threads 32 on the deflector and on the fitting. The top edge 33 of the deflector may be used to prevent accidental withdrawal of the fitting from the cover opening, this top edge bearing against the under side of the bearing ring.

In the usual fashion of suction cleaners, the outer end of the inlet fitting is suitably connected to the nozzle 34 of the cleaner as by a flexible hose 35. The free end of the hose 35 may be made as a rigid tube or wand connected to the nozzle as is preferred in many cleaners of this character. Manipulation of the nozzle on the floor or other surfaces surrounding the cleaner causes the inlet and the deflector to rotate within the cleaner as the user walks around the tank. This rotation insures that discharge of dirt laden air from the deflector will not be concentrated in any one place but will be spread fairly evenly around the circumference of the inside of the cleaner.

Cooperating with this rotatable discharge, I have provided a dust collecting filter bag 36 which completely surrounds the inlet and, in every position of the discharge deflector, presents an initial filtering face 37 very nearly parallel to the direction of air discharged by the deflector. This rotating discharge, its horizontal deflection, and the direction of discharge with respect to the initial filtering area prevents piling of accumulated dirt in one place and prevents the concentrated air blast of the intake from exercising its effect on any single portion of the filter. This is especially important where the filter is made of relatively fragile material such as the porous papers or felted fiber mats now becoming popular for use in disposable bags and filters in vacuum cleaners.

As an example of filter construction using fragile disposable material, I have shown a design in the present application similar to that shown and claimed in the application of A. E. Smith, Serial No. 57,558, filed October 30, 1948, now Patent 2,591,382, dated April 1, 1952, and assigned to the same assignee as the present application. This filter arrangement includes an outer porous bag or support 38 made of cloth or other relatively sturdy material, this outer bag being held in place as by a supporting ring 39 which is suitably sealed at its edges as by the cover gasket 3. Over the top of this bag and also sealed at its outside edges as by the gasket 3 is positioned a removable dome or cone 40 which has a central opening 41. A sealing gasket ring 42 made of sponge rubber or other suitable compressible material surrounds the opening 41 and seals the edge of the dome opening 41 around the inlet in the cover. There is thus provided a sealed space 43 between the cover and the dome which is outside of the air flow through the cleaner.

The disposable filter bag, which is the bag 36 previously mentioned, fits generally within the outer supporting bag 38, but has side walls which are the initial filtering surfaces 37 previously mentioned, these side walls extending under the dome, through the central opening 41, expanding into an open mouth portion 44 having edges which pass over the gasket ring 42 into the sealed space 43. This arrangement leaves the edges of the disposable bag clean at all times as outlined more fully in the above noted Smith application, so that these top edges of the disposable bag may be easily closed without soiling the hands and may be conveniently used to carry the disposable bag when throwing it away.

With the present arrangement it will be noted that even though the filter bag is made of comparatively fragile material, the disposable bag need not be damaged by the discharge of air from the inlet, because of the swivel connection of the inlet combined with the deflector which provides impingement of the air blast in a direction at a low angle to the initial filtering surface of the filter bag. It will be noted that a substantial portion of the inside of the filtering bag assumes the shape of an annulus 45 surrounding the perforated screen 9 below the top of the motor and fan unit around the circumference of the canister. This area of the filter bag is relatively free from disturbance by air flowing through the cleaner, being remote from the inlet and outside of the initial air blast area. Therefore, most of the dust will collect in this space and the period of operation of the cleaner, without need for removal of accumulated dust, will be further extended.

I have described above the structures and operation of the cleaner in normal circumstances, that is, when the device is used as a suction cleaner. This was the extent of the disclosure in my application Serial No. 159,493, now Patent 2,539,195.[, of which the present application is a continuation-in-part.]

For certain cleaning operations it is desirable that the cleaner be adapted for conversion to use as a blower. In this case an opening 46 is provided in the outer wall of the canister body 1 directly opposite and registering with the opening 16. A blower tube 46a (see broken lines, Fig. 4) which fits well in the opening 16 may be inserted through the opening 46 and seated in the opening 16, and the flexible hose 35 or attachments may be connected to this blower tube. Note that in such case the air is exhausted directly from the chamber 14 and opening 16 to the atmosphere, and the annular discharge or exhaust chambers 17 and 20 as well as the exhaust opening 21 are bypassed.

The opening 46 is normally closed during use of the device as a suction cleaner. This may be accomplished by a pair of doors 47 hinged as at 48 to the canister wall and biased toward closed position as by springs 49. Insertion of the blower tube will open the doors inwardly, and withdrawal of the tube will allow the doors to close and to seal the opening 46.

Rather than the hinged door arrangement, I may prefer to use the construction shown in Fig. 3 to close the opening 46 when desired. This includes a cover plate 50 having spring clips 51 which can resiliently and releasably engage the edges of the opening 46. A handle or knob 52 on the outside of the cover plate is used to position the plate properly and to remove it from the opening when desired. Held in place on the inside face of the cover plate in the manner shown, or otherwise, is a sealing disc or gasket 53 of cork, rubber, or other suitable material.

As will be evident from the foregoing description, certain aspects of my invention are not limited to the particular details of construction of the example illustrated, and I contemplate that various and other modifications and applications of the invention will suggest themselves to one skilled in the art. It is my intention, therefore, that the appended claims shall cover such modifications and other applications as do not depart from the true spirit and scope of my present invention.

What I claim as new and desire to secure by Letters Patent of the United States is:

1. In a suction cleaner of the type having an open body with outer substantially vertical side walls and a bottom adapted to be placed on a horizontal supporting surface, a cover completing and closing the open portion of the body, a suction creating fan and motor unit within the body near the bottom thereof, an air inlet opening located in the body, and a dirt filter in the body in the suction side of the fan and motor unit communicating with said inlet, that improvement which comprises a horizontal platform in said body supporting said fan and motor unit and dividing said body into an upper suction section and a lower discharge section, inner vertical walls in said lower section extending between said bottom of the body and said horizontal platform in the exhaust side of said fan and motor unit and forming together with said outer vertical side walls, a central initial discharge chamber from the unit and an outer annular exhaust chamber surrounding the central chamber, a passageway for air from said central chamber to said outer chamber, said chamber opening to the atmosphere through said body side walls throughout substantially the entire circumference of the body at a level substantially above the supporting surface level.

2. In a suction cleaner of the type having an open top canister with outer vertical side walls and a bottom adapted to be placed on a horizontal supporting surface, a cover closing the open top of the canister, a suction creating fan and motor unit centrally located within the canister near the bottom thereof, an air inlet opening located in the canister cover and a dirt filtering bag in the canister above the fan and motor unit with an open top communicating with said inlet opening, that improvement which comprises a horizontal platform in said canister supporting said fan and motor unit and sealing said canister into an upper suction section and a lower discharge section, inner vertical walls in said lower section extending between said canister bottom and said horizontal platform around said fan and motor unit and forming, together with said canister outer vertical side walls, a central initial exhaust chamber surrounding the unit and an outer annular discharge chamber surrounding the central chamber, a passageway for air from said central chamber to said outer chamber, said canister side walls being open throughout substantially the entire circumference of said canister around said fan and motor unit at a level substantially above the supporting surface level but below said horizontal platform.

3. In a suction cleaner of the type having an open top canister with outer vertical side walls and a bottom adapted to be placed on a horizontal supporting surface, a cover closing the open top of the canister, a suction creating fan and motor unit centrally located within the canister near the bottom thereof, an air inlet opening located in the canister cover and a dirt filtering bag in the canister with an open top communicating with said inlet opening above the fan and motor unit, that improvement which comprises a horizontal platform in said canister supporting said fan and motor unit and dividing said canister into an upper suction section and a lower discharge section, noise suppressing material in said discharge section, inner vertical walls below said platform around said fan and motor unit and forming, together with said canister outer vertical side walls, a central exhaust chamber surrounding the unit and an outer annular discharge chamber surrounding the central chamber, a passageway for air from said central chamber to said outer chamber, said outer chamber opening to the atmosphere through said canister side walls throughout substantially the entire circumference of the canister around said fan and motor unit.

4. In a suction cleaner of the type having an open top canister with outer side walls and a bottom adapted to be placed on a horizontal supporting surface, a cover closing the open top of the canister, a suction creating fan and motor unit within the canister near the bottom thereof, an air inlet opening located in the canister cover, a dirt filtering bag in the canister with an open top communicating with said inlet opening and a bottom in said bag position above the fan and motor unit, that improvement which comprises a frame in said canister supporting said fan and motor unit centrally of the canister and having a horizontal platform dividing and sealing said canister into an upper suction section and a lower discharge section, inner vertical walls below said horizontal platform around said fan and motor unit and forming, together with said canister outer side walls, a central exhaust chamber surrounding the unit and an outer annular discharge chamber surrounding the central chamber, said inner walls having an opening therein for passing air from said central chamber to said outer chamber, a discharge passageway for air from said outer chamber through said canister side walls, said passageway opening to the outer air around substantially the entire circumference of the canister, and noise suppressing and dirt filtering material in said discharge passageway.

5. In a suction cleaner of the type having a body with end and side walls, an air moving fan and motor unit within the body, an air inlet opening located in one end of the body and a dirt filter in the body between said unit and said inlet, that improvement which comprises a transverse partition in said body supporting said unit and dividing the interior of said body into a suction end section on one side of the unit and a discharge end section on the other side of said unit, inner walls in said discharge section extending between the discharge end of the body and said partition and confining the exhaust from said air moving unit, said inner walls forming, together with said side and end walls of the body, a central initial discharge chamber from the unit and an outer annular diffusing exhaust chamber surrounding the central chamber, said outer exhaust chamber diffusing air to the atmosphere throughout substantially the entire circumference of the side walls of the body, a single exhaust passageway through said inner walls between said chambers, a single blower passageway through said side walls in registry with said exhaust passageway, and a blower cover removably closing said blower passageway, whereby with the blower cover removed, air for blowing will pass directly from said exhaust passageway through said blower passageway without being diffused.

6. In a suction cleaner of the type having a body with top, bottom and side walls, an air moving fan and motor unit within the body, an air inlet opening located in the top of the body, and a dirt filter in the body between said unit and said inlet, that improvement comprising a transverse partition in said body supporting said unit and dividing and sealing the interior of said body into an upper suction section above said unit and a lower discharge section below said unit, inner walls in said discharge section extending between the bottom of the body and said partition and confining the exhaust from said air moving unit, said inner walls, together with said side and end walls and said partition, forming a central initial discharge chamber for air from said unit and an outer annular diffusing exhaust chamber surrounding the central chamber, said exhaust chamber being open to the atmosphere throughout substantially the entire circumference of said side walls, a single restricted exhaust passageway through said inner wall between said central and said outer chambers, a single restricted blower passageway through said side walls in registry with said exhaust passageway, and a blower cover removably closing said blower passageway said passageways being adapted to receive a blower tube whereby air for blowing may be passed directly out of the cleaner from said exhaust passageway.

7. A suction cleaner comprising a bucket body having a bottom and outer circumferential wall, a motor and fan unit near the bottom of the bucket, an air filter above the unit, an air inlet above the filter, inner walls around the unit enclosing a central exhaust chamber, and forming an annular discharge chamber outside said exhaust chamber inside said outer circumferential walls, said outer walls having a band of discharge ports therein extending substantially entirely around the bucket body, said inner and said outer walls having registering holes therein leading to said central exhaust chamber, and a movable door closing said hole in said outer wall.

*8. In a suction cleaner of the type having an open body with outer, substantially vertical, side walls and a bottom wall adapted to be placed on a horizontal supporting surface, a cover closing the open portion of the body, a suction creating fan and motor unit within the body near the bottom thereof, an air inlet opening located in the body above said unit, and a dirt filter positioned in the body above said unit and communicating with said inlet, that improvement which comprises a platform in said body supporting said unit and dividing said body into an upper suction section, and a lower discharge section, inner vertical walls in said discharge section that extend between the bottom wall and the platform, and form a central, initial, discharge chamber within said inner walls and an outer, annular, discharge chamber between said inner walls and said outer walls, an opening in said inner walls placing said chambers into communication with each other, and a plurality of spaced discharge openings in said outer walls at a level substantially above the supporting surface level, said openings constituting means for diffusing the air in said outer discharge chamber to the atmosphere.*

References Cited in the file of this patent or the original patent

UNITED STATES PATENTS

| Number | Name | Date |
|---|---|---|
| 2,438,183 | Sparklin | Mar. 23, 1948 |
| 2,539,195 | Lang | Jan. 23, 1951 |

Certificate of Correction

Reissue No. 23,852 July 13, 1954

Henry T. Lang

It is hereby certified that error appears in the printed specification of the above numbered patent requiring correction as follows:

Column 1, line 45, for "shownig" read showing ; column 6, line 75, for "position" read positioned ; column 8, line 64, list of references cited, for "2,438,183" read 2,438,133 ;

and that the said Letters Patent should be read as corrected above.

Signed and sealed this 28th day of September, A. D. 1954.

[SEAL]

ARTHUR W. CROCKER,
*Assistant Commissioner of Patents.*